US012789534B2

(12) United States Patent
Hamada

(10) Patent No.: US 12,789,534 B2
(45) Date of Patent: Nov. 10, 2026

(54) IMAGE FORMING APPARATUS CONTROLLING POWER SUPPLY TO HEATER

(71) Applicant: KYOCERA Document Solutions Inc., Osaka (JP)

(72) Inventor: Takuya Hamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 175 days.

(21) Appl. No.: 18/656,817

(22) Filed: May 7, 2024

(65) Prior Publication Data

US 2024/0383263 A1 Nov. 21, 2024

(30) Foreign Application Priority Data

May 16, 2023 (JP) ................................ 2023-080525

(51) Int. Cl.
*B41J 2/375* (2006.01)
*B41J 2/355* (2006.01)

(52) U.S. Cl.
CPC ............ *B41J 2/375* (2013.01); *B41J 2/3558* (2013.01)

(58) Field of Classification Search
CPC ...... B41J 2/375; B41J 2/3558; B41J 2/04515; B41J 2/0452; B41J 2/04563; B41J 2/04565
See application file for complete search history.

(56) References Cited

U.S. PATENT DOCUMENTS

2010/0188456 A1 7/2010 Gadke et al.
2011/0299868 A1* 12/2011 Ito ...................... G03G 15/2039 399/88
2019/0179669 A1* 6/2019 Yamazaki .............. G06F 9/544
2023/0091206 A1 3/2023 Hasegawa
2024/0020499 A1* 1/2024 Tamagawa ........... G06K 15/023
2024/0103956 A1* 3/2024 Shioyasu ............ G06F 11/0724

FOREIGN PATENT DOCUMENTS

JP 2010167783 A 8/2010
JP 2023041403 A 3/2023

* cited by examiner

*Primary Examiner* — Kristal Feggins
(74) *Attorney, Agent, or Firm* — IP Business Solutions, LLC.

(57) ABSTRACT

An image forming apparatus includes a heater, a temperature sensor, a power supply circuit, a main processor, and a sub-processor. The temperature sensor is configured to detect a temperature of the heater. The power supply circuit is configured to perform power supply to the heater. The main processor is configured to supply a heater control signal to the power supply circuit based on the temperature detected by the temperature sensor to control the power supply circuit and adjust the temperature of the heater. The sub-processor (a) monitors whether or not an output from the main processor is made regularly, and (b) supplies, to the power supply circuit, the heater control signal for cutting off the power supply to the heater when determination is made that the output is not made.

5 Claims, 2 Drawing Sheets

IMAGE FORMING APPARATUS CONTROLLING POWER SUPPLY TO HEATER

INCORPORATION BY REFERENCE

This application claims priority to Japanese Patent Application No. 2023-080525 filed on May 16, 2023, the entire contents of which are incorporated by reference herein.

BACKGROUND

The present disclosure relates to an image forming apparatus.

In a certain ink jet printer, a voltage of a thermistor attached to a print head is supplied to a controller after analog-digital conversion, and the controller adjusts an amount of power to a heater of the print head according to the voltage. In this ink jet printer, an electronic circuit that detects the voltage of the thermistor and cuts off power supply to the heater according to the voltage is provided separately from the controller.

A certain ink jet printing apparatus includes a drying device and a central processing unit (CPU), and the CPU controls a heater provided in the drying device such that a temperature of the heater reaches a set temperature while acquiring a temperature measurement value by a temperature sensor provided in the heater to monitor the temperature of the heater.

SUMMARY

As one aspect of the present disclosure, an enhancement of the above-described technique is suggested.

An image forming apparatus according to an aspect of the present disclosure includes a heater, a temperature sensor, a power supply circuit, a main processor, and a sub-processor. The temperature sensor is configured to detect a temperature of the heater. The power supply circuit is configured to perform power supply to the heater. The main processor is configured to supply a heater control signal to the power supply circuit based on the temperature detected by the temperature sensor to control the power supply circuit and adjust the temperature of the heater. The sub-processor (a) monitors whether or not an output from the main processor is made regularly and (b) supplies, to the power supply circuit, the heater control signal for cutting off the power supply to the heater when determination is made that the output is not made.

DETAILED DESCRIPTION

Hereinafter, an image forming apparatus according to an embodiment as an aspect of the present disclosure will be described with reference to the drawings.

Figure 1:
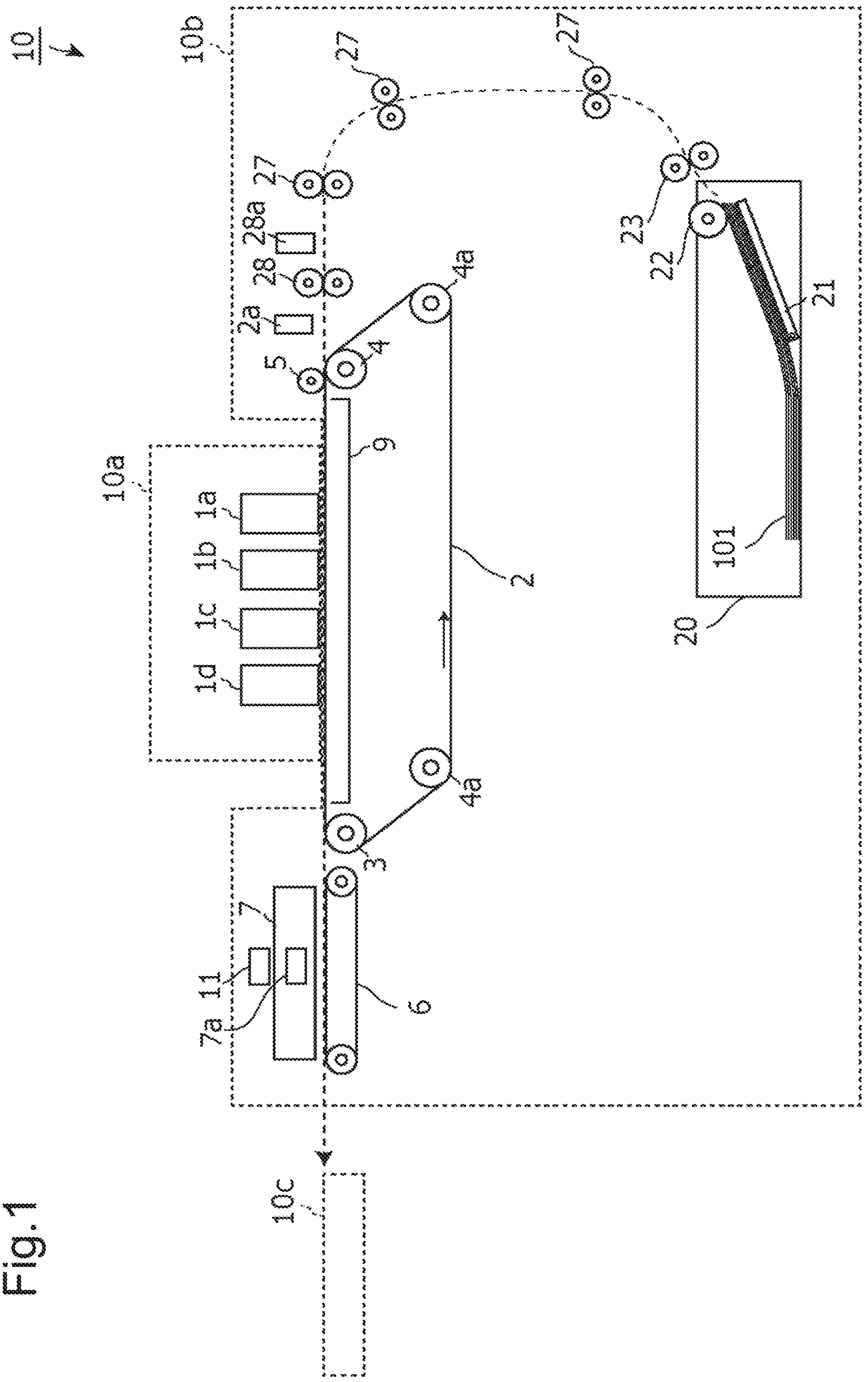
FIG. 1 is a diagram showing an image forming apparatus according to an embodiment of the present disclosure.

FIG. 1 is a diagram showing the image forming apparatus according to the embodiment of the present disclosure. An image forming apparatus 10 shown in FIG. 1 is an apparatus such as a printer, a copying machine, a facsimile machine, or a multifunction peripheral, and includes a line head-type ink jet system color print mechanism in the embodiment.

The image forming apparatus 10 shown in FIG. 1 includes a print engine 10*a* and a sheet transport device 10*b*. The print engine 10*a* applies ink to a print sheet 101 as a recording medium to physically print an image to be printed on the print sheet 101. For example, an ink cartridge can be attached and detached to and from the print engine 10*a*, and the print engine 10*a* performs printing using ink supplied from the ink cartridge. The sheet transport device 10*b* is a transport device that transports the print sheet 101 to the print engine 10*a*.

In the embodiment, the print engine 10*a* includes line head-type recording heads 1*a* to 1*d* corresponding to four ink colors including cyan, magenta, yellow, and black. The recording heads 1*a* to 1*d* eject ink of the ink colors with nozzles to form an image to be printed on the print sheet 101 of a certain recording medium classification. In a case of a monochromatic image forming apparatus, one recording head is provided.

In the embodiment, the sheet transport device 10*b* includes an annular transport belt 2 that is disposed to face the print engine 10*a* and transports the print sheet 101, a drive roller 3 on which the transport belt 2 is suspended, a driven roller 4, and a tension roller 4*a*, an adsorption roller 5 that nips the print sheet 101 with the transport belt 2, a post-stage transport belt 6, and a drying device 7.

The drive roller 3, the driven roller 4, and the tension roller 4*a* rotate the transport belt 2. Then, the adsorption roller 5 nips the print sheet 101 transported from a sheet feed cassette 20 described below, the nipped print sheet 101 is transported by the transport belt 2 to printing positions of the recording heads 1*a* to 1*d* in turn, and images of the respective colors are printed by the recording heads 1*a* to 1*d*. In this case, passage of the print sheet 101 is detected by a sheet sensor 2*a*, and a current position of the print sheet 101 on a transport path is specified based on a detection timing. With this, an image is printed at an appropriate position on the print sheet 101. Then, the print sheet 101 after printing is completed is discharged to a discharge tray 10*c* or the like by the post-stage transport belt 6. In this case, the print sheet 101 on which ink is ejected is dried by the drying device 7.

Specifically, the drying device 7 includes a heater 7*a* and an air blower, and dries the print sheet 101 on which images are formed by the recording heads 1*a* to 1*d*, using the heater 7*a* and the air blower.

A temperature sensor 11 that detects a temperature of the heater 7*a* is provided. The temperature sensor 11 includes, for example, a thermistor and a drive circuit for a thermistor.

A sheet suction device 9 is disposed along a transport path of a sheet. Negative pressure is applied to the sheet suction device 9, whereby the print sheet 101 is adsorbed to the transport belt 2 via sheet suction holes.

The sheet transport device 10*b* includes the sheet feed cassette 20 as a sheet feed source. The sheet feed cassette 20 accommodates the print sheets 101, and pushes up the print sheets 101 with a lift plate 21 to bring the print sheets 101 into contact with a pickup roller 22. The print sheets 101 placed in the sheet feed cassette 20 are picked up by the pickup roller 22 one by one from the top to a sheet feed roller 23. The sheet feed roller 23 transports the print sheets 101 fed from the sheet feed cassette 20 by the pickup roller 22 on the transport path one by one.

A transport roller 27 transports the print sheet 101 on a predetermined transport path. When the print sheet 101 being transported is detected by a registration sensor 28*a*, a registration roller 28 temporarily stops the print sheet 101 and transports the print sheet 101 to the print engine 10*a* (specifically, to the nip position of the adsorption roller 5 and the transport belt 2) at a secondary sheet feed timing. The secondary sheet feed timing is designated by a controller (a sub-processor described below) such that an image is formed at a designated position on the print sheet 101.

Figure 2:
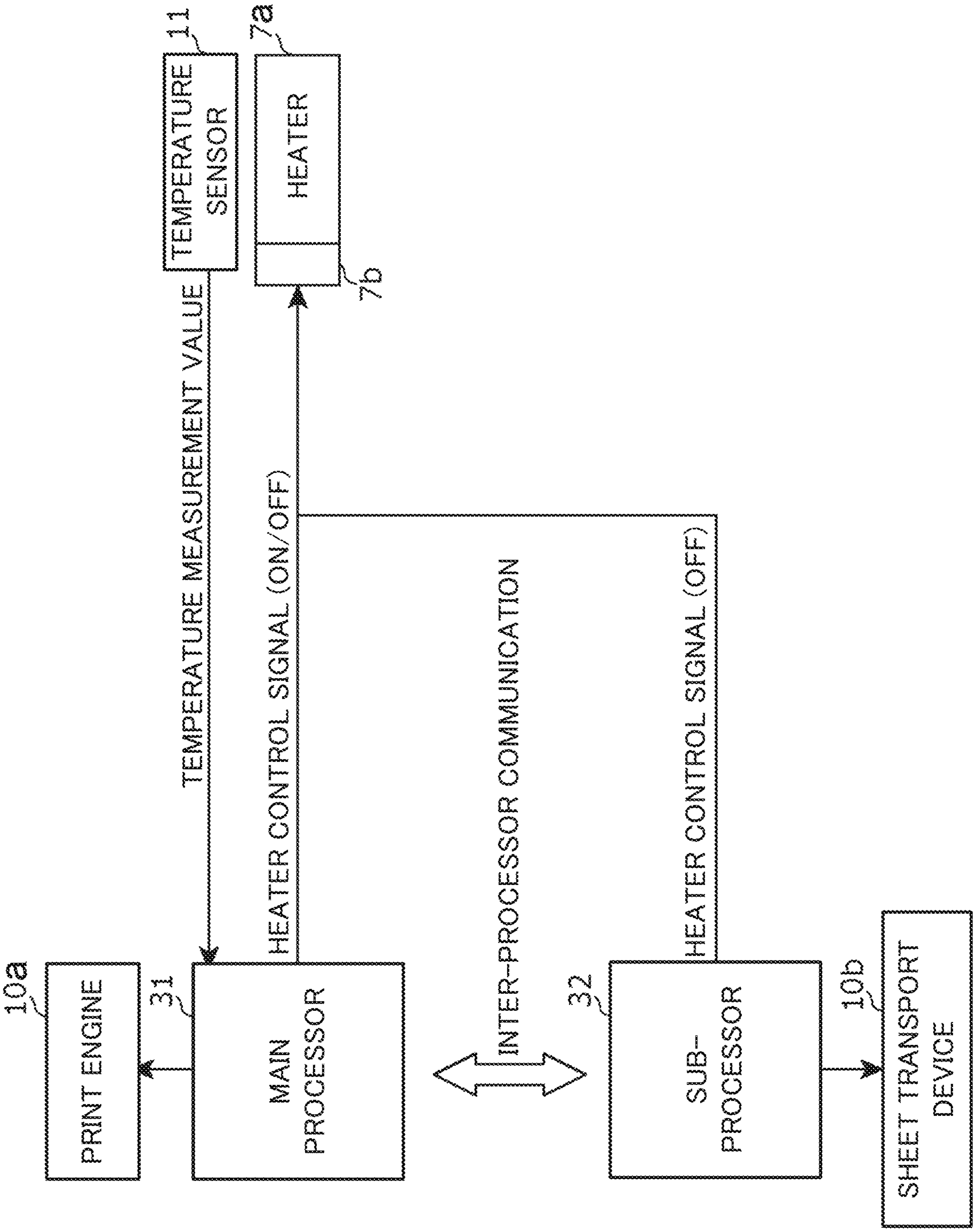
FIG. 2 is a block diagram showing an electrical configuration of the image forming apparatus according to the embodiment of the present disclosure.

FIG. 2 is a block diagram showing an electrical configuration of the image forming apparatus 10 according to the embodiment of the present disclosure. As shown in FIG. 2, the image forming apparatus 10 includes a power supply circuit 7*b* that performs power supply to the heater 7*a*, a main processor 31, and a sub-processor 32. Each of the main processor 31 and the sub-processor 32 includes a CPU, loads a program into a random access memory (RAM), and executes processing (data processing, control, and the like) according to the program.

In the embodiment, the main processor 31 controls the print engine 10*a* that forms an image on a print sheet using a color material, and the sub-processor 32 controls an internal device (here, the sheet transport device 10*b*) outer than the print engine 10*a* in the image forming apparatus 10.

The main processor 31 supplies a heater control signal to the power supply circuit 7*b* based on a temperature (specifically, a temperature measurement value output from the temperature sensor 11) detected by the temperature sensor 11 to control the power supply circuit 7*b* and adjust the temperature of the heater 7*a* to a desired temperature.

The sub-processor 32 (*a*) monitors whether or not an output (a specific message by inter-processor communication, a specific control signal to the print engine 10*a*, or the like) from the main processor 31 is made regularly, and (b) directly supplies, to the power supply circuit 7*b*, the heater control signal for cutting off the power supply to the heater 7*a* when determination is made that the output is not made. With this, when the temperature of the heater 7*a* increases abnormally, even when the main processor 31 is locked due to a certain cause (program error, noise, thermal runaway, or the like) and cannot control the heater 7*a*, the power supply to the heater 7*a* is cut off by the sub-processor 32 as appropriate.

For example, the sub-processor 32 monitors a control signal from the main processor 31 to the print engine 10*a*, and in a case where a specific control signal cannot be detected, determines that an output from the main processor 31 is not made and supplies, to the power supply circuit 7*b*, the heater control signal for cutting off the power supply to the heater 7*a*.

The above-described inter-processor communication may not be two-way communication, and it should suffice that data transfer from the main processor 31 to the sub-processor 32 is performed. A load of the sub-processor 32 may be set smaller than a load of the main processor 32 such that it is difficult for a problem to occur. As the sub-processor 32, a processor having an allowable maximum temperature higher than the main processor 31 may be used.

In the embodiment, a detection circuit other than the main processor 31 for an output of the temperature sensor 11 is not provided in parallel with the main processor 31, and mixing of noise with the temperature measurement value is suppressed.

Next, the operation of the image forming apparatus 10 will be described.

For printing on the print sheet, the sub-processor 32 controls the sheet transport device 10*b*, and the main processor 31 controls the print engine 10*a*. In this case, the main processor 31 supplies the heater control signal to the power supply circuit 7*b* to control the heater 7*a* for drying of the print sheet 101 after printing as described above. On the other hand, the sub-processor 32 monitors whether or not there is an output from the main processor 31, and in a case where the output from the main processor 31 is detected, does nothing on the power supply circuit 7*b* of the heater 7*a*.

On the other hand, in a case where a specific output from the main processor 31 cannot be detected, the sub-processor 32 supplies, to the power supply circuit 7*b* of the heater 7*a*, the heater control signal for cutting off the power supply to the heater 7*a*, and causes the power supply circuit 7*b* to cut off the power supply to the heater 7*a*. With this, even in a situation in which the main processor 31 is locked, abnormal increase in temperature of the heater 7*a* is suppressed.

As described above, according to the above-described embodiment, the temperature sensor 11 detects the temperature of the heater 7*a*, and the power supply circuit 7*b* performs the power supply to the heater 7*a*. The main processor 31 supplies the heater control signal to the power supply circuit 7*b* based on the detected temperature to control the power supply circuit 7*b* and adjust the temperature of the heater 7*a*. Then, the sub-processor 32 (*a*) monitors whether or not an output from the main processor 31 is made regularly, and (b) supplies, to the power supply circuit 7*b*, the heater control signal for cutting off the power supply to the heater 7*a* when determination is made that the output is not made.

With this, when a problem occurs in the processor 31 for heater control, the power supply to the heater 7*a* is cut off as appropriate at a comparatively low cost without additionally providing a dedicated electronic circuit as described above. That is, because the sub-processor 32 that controls the internal device monitors the output of the main processor 31, there is no need for additionally providing a dedicated circuit, and low cost is achieved.

In the ink jet printer described in BACKGROUND, when the temperature increases, the power supply to the heater can be cut off by the above-described electronic circuit even when the controller fails; however, the dedicated electronic circuit needs to be provided, the number of components increases accordingly, and the cost of the apparatus increases.

In contrast, according to the above-described embodiment, even when a problem occurs in a processor for heater control, it is possible to cut off the power supply to the heater at a comparatively low cost as appropriate without additionally providing a dedicated electronic circuit.

These and other objects, features, and advantages of the present disclosure will be more apparent upon reading of the following detailed description along with the accompanying drawings.

It should be understood that various changes and modifications to the above-described embodiment will be apparent to those skilled in the art. Such changes and modifications may be made without departing from the spirit and scope of the present subject matter and without diminishing its intended advantages. It is therefore intended that such changes and modifications be covered by the appended claims.

For example, in the above-described embodiment, although the heater 7*a* provided in the drying device 7 is controlled, in the same manner, a heater provided in the print engine 10*a* may be controlled.

The present disclosure can be applied to, for example, an image forming apparatus such as a printer or a multifunction peripheral.

What is claimed is:

1. An image forming apparatus comprising:

a heater;

a temperature sensor configured to detect a temperature of the heater;

a power supply circuit configured to perform power supply to the heater;

a main processor configured to supply a heater control signal to the power supply circuit based on the temperature detected by the temperature sensor to control the power supply circuit and adjust the temperature of the heater;

a sub-processor; and a print engine configured to form an image on a print sheet using a color material, wherein the sub-processor monitors a control signal from the main processor to the print engine or an inter-processor communication from the main processor, determines whether or not an output from the main processor is made regularly based on the control signal or the inter-processor communication, and supplies, to the power supply circuit, the heater control signal for cutting off the power supply to the heater when determination is made that the output is not made.

2. The image forming apparatus according to claim 1, wherein the sub-processor controls an internal device of the image forming apparatus.

3. The image forming apparatus according to claim 2, further comprising:

a transport device configured to transport the print sheet to the print engine, wherein the main processor controls the print engine, and the sub-processor controls the transport device as the internal device.

4. The image forming apparatus according to claim 1, further comprising:

a drying device configured to dry the print sheet after printing in an ink jet system, wherein the heater is provided in the drying device.

5. The image forming apparatus according to claim 1, further comprising:

a print engine configured to form an image on a print sheet using a color material; and a transport device configured to transport the print sheet to the print engine, wherein the main processor controls the print engine, and the sub-processor controls the transport device as the internal device, and the heater is provided in the print engine.

* * * * *